(12) United States Patent
Okura et al.

(10) Patent No.: US 8,665,354 B2
(45) Date of Patent: Mar. 4, 2014

(54) SOLID-STATE IMAGE PICKUP DEVICE

(75) Inventors: Shunsuke Okura, Kanagawa (JP);
Mitsuo Magane, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 20 days.

(21) Appl. No.: 13/560,811

(22) Filed: Jul. 27, 2012

(65) Prior Publication Data
US 2013/0057737 A1 Mar. 7, 2013

(30) Foreign Application Priority Data

Sep. 2, 2011 (JP) ................................. 2011-191437

(51) Int. Cl.
*H04N 3/14* (2006.01)
(52) U.S. Cl.
USPC ........................................ 348/308; 348/222.1
(58) Field of Classification Search
None
See application file for complete search history.

(56) References Cited

U.S. PATENT DOCUMENTS

| 7,586,431 B2 * | 9/2009 | Muramatsu et al. | .......... 341/164 |
| 7,652,690 B2 | 1/2010 | Hatani et al. | |
| 2009/0295959 A1 | 12/2009 | Shoho et al. | |

FOREIGN PATENT DOCUMENTS

| JP | 2006-025189 | 1/2006 |
| JP | 2007-282204 | 10/2007 |
| JP | 2009-130827 | 6/2009 |
| JP | 2009-290613 | 12/2009 |

* cited by examiner

*Primary Examiner* — Roberto Velez
*Assistant Examiner* — Angel L Garces-Rivera
(74) *Attorney, Agent, or Firm* — McDermott Will & Emery LLP

(57) ABSTRACT

In a solid-state image pickup device, each pixel at a selected row outputs to a corresponding column signal line a first analog signal in accordance with an amount of electric charges at an electric charge accumulation section in an initial state and a second analog signal in accordance with an amount of photoelectric charges transferred to the electric charge accumulation section. An A/D converter provided at each column performs A/D conversion on the first and second analog signals to output first and second digital signals, respectively. Of first to third latch circuits provided at each column, the first latch circuit takes in and holds the first digital signal outputted from the A/D converter. The second latch circuit takes in and holds the first digital signal held at the first latch circuit. The third latch circuit takes in and holds the second digital signal outputted from the A/D converter.

7 Claims, 15 Drawing Sheets

SOLID-STATE IMAGE PICKUP DEVICE

CROSS-REFERENCE TO RELATED APPLICATIONS

The disclosure of Japanese Patent Application No. 2011-191437 filed on Sep. 2, 2011 including the specification, drawings, and abstract is incorporated herein by reference in its entirety.

BACKGROUND

The present invention relates to a solid-state image pickup device.

Typically, mainstream cameras used to be those of a film type, but cameras of a digital type have recently become alternatives thereto. Further, image quality improvement in the digital cameras is remarkable, and the latest digital cameras have performance surpassing that of film cameras.

In the digital camera, an object is captured by a lens and focused as an optical image onto a solid-state image pickup device. As this solid-state image pickup device, there are mainly CCD (Charge Coupled Devices) and CMOS (Complementary Metal Oxide Semiconductors) image sensors. From a view point of camera performance improvement, the CMOS image sensors in which a CMOS circuit for image processing can easily be loaded as a peripheral circuit have attracted attention.

The CMOS image sensors include: analog image sensors and digital image sensors. Both of them have advantages and disadvantages, but from a view point of data processing speed, there are high expectations for the detail image sensors. Use of the digital image sensor not only makes it possible to take a moving image of high quality but also enables combination with image processing at a later stage for various applications. For example, it is possible for the camera to automatically determine a shutter chance of an instance at which a ball hits a tennis racket or a close-up photo of a child reaching a goal while running around a playground in an athletic meet and automatically press a shutter only by orienting the camera in the aimed direction.

In the digital image sensor, an analog-to-digital (A/D) converter is provided at each column of a pixel array. For example, Japanese Unexamined Patent Publication No. 2009-130827 discloses a digital image sensor using an A/D converter of an integral type. More specifically, in this document, the pixel array includes a plurality of pixels arrayed in N-number of rows×M-number of columns, and analog pixel signals are outputted to M-number of column signal lines corresponding to the respective columns. A latch circuit is provided in correspondence with each column, and latches, as a digital pixel signal of predetermined bits, a count value for a voltage level of a ramp signal to reach a voltage level of an analog pixel signal read via the corresponding column signal line. The latched digital pixel signal of the predetermined bits is outputted to a control section.

A digital image sensor disclosed in Japanese Unexamined Patent Publication No. 2009-290613 also uses an A/D converter of an integral type. The digital image sensor in this document differs from the digital image sensor in patent document described above in that n-bit latch circuits at later stages are further provided respectively in correspondence with n-bit latch circuits at previous stages holding output of an n-bit counter. The n-bit latch circuit at the later stage holds a digital pixel signal outputted from the n-bit latch circuit at the previous stage. The digital pixel signals held at the respective n-bit latch circuits at the later stages are sequentially shifted to one end side to be thereby taken out.

In the case of this document, a CDS (Correlated Double Sampling) circuit is further provided at a stage before each A/D converter. The CDS circuit is a circuit for reducing read noise and typically used in CCDs (see, for example, Japanese Unexamined Patent Publication No. 2007-282204).

The CDS circuit described in the above document performs noise cancellation on an analog pixel signal, but a technology of performing noise cancellation on a digital pixel signal obtained through A/D (Analog-to-Digital) conversion in the same manner is disclosed in Japanese Unexamined Patent Publication No. 2006-25189.

More specifically, with the image sensor described in this document, A/D conversion is performed by the A/D converter on each of a signal level and a reset level outputted from each pixel. The signal level obtained through the A/D conversion is stored into a first register, and the reset level obtained through the A/D conversion is stored into a second register. An adder obtains a difference between the level signals respectively stored in the first and second registers. With this configuration, offset variation of the A/D converter is cancelled, thus providing an advantage that variable noise of a column circuit causing vertical line noise is cancelled.

SUMMARY

In the digital image sensor described in Japanese Unexamined Patent Publication No. 2009-290613, n-bit latch circuits at a previous stage and a later stage are provided for each column. Therefore, on the background where A/D conversion processing is performed on an analog pixel signal of each pixel at the (k+1)-th row, horizontal transfer processing of taking out a result of A/D conversion on each pixel signal at the k-th row, which is the last row, held at the n-bit latch circuit at the later stage can be performed.

On the other hand, in the digital image sensor described in Japanese Unexamined Patent Publication No. 2006-25189, two latch circuits (registers) are provided for each column of an image array, but they are for holding a reset level and a signal level, respectively, and background processing as described above cannot be performed. As far as the inventors of the present invention know, there has been so far no example in which the background processing is realized by a method of performing digital noise cancellation as described in Japanese Unexamined Patent Publication No. 2006-25189. In imitation to the method described in Japanese Unexamined Patent Publication NO. 2009-290613, it is possible to make a change to a two-stage configuration with a latch circuit for holding a reset level and a latch circuit for holding a signal level respectively provided at a previous stage and a later stage, but simply providing the latch circuits with the two-stage configuration causes a problem that a circuit size increases.

It is an object of the present invention to provide a solid-state image pickup device capable of performing noise cancellation, by correlation double sampling, on a digital pixel signal obtained after A/D conversion and also capable of performing horizontal transfer of the digital pixel signal already subjected to the A/D conversion in parallel with the A/D conversion processing.

A solid-state image pickup device according to a first embodiment of the present invention includes: a pixel array; a plurality of column signal lines; a row selection circuit; a plurality of analog-to-digital converters; and a plurality of data holding sections. The pixel array includes a plurality of pixels arrayed in a matrix form, and each pixel has a photoelectric conversion element and an electric charge accumulation section. The row signal lines are provided respectively in correspondence with columns of the pixel array. The row selection circuit selects a row of the pixel array and activates a reset signal and a transfer signal outputted to each pixel at the selected row in order just mentioned. When the inputted reset signal is in an active state, each pixel at the selected row initializes the electric charge accumulation section and outputs to the corresponding column signal line, as a first analog signal, a signal in accordance with an amount of electric charges in the electric charge accumulation section in an initial state. When the inputted transfer signal is in an active state, each pixel at the selected row transfers to the electric charge accumulation section photoelectric charges generated by the photoelectric conversion element and outputs to the corresponding column signal line, as a second analog signal, a signal in accordance with the amount of electric charges in the electric charge accumulation section after the transfer of the photoelectric charges. The analog-to-digital converters are respectively in correspondence with the columns of the pixel array, and each of the analog-to-digital converters digitally converts the first and second analog singles received via the column signal lines at the corresponding columns to respectively output first and second digital signals. The data holding sections are provided respectively in correspondence with the columns of the pixel array. Each of the data holding sections includes first to third latch circuits. The first latch circuit takes in and holds the first digital signal outputted from the analog-to-digital converter provided at the corresponding column based on a first pulse signal generated during a period from when the reset signal outputted to the currently selected row turns to an inactive state to when the transfer signal subsequently turns to an active state. The second latch circuit takes in and holds the first digital signal held at the first latch circuit based on a second pulse signal generated during a period from when the transfer signal outputted to the currently selected row turns to an inactive state to when the reset signal outputted to the next selected row turns to an active state. The third latch circuit takes in and holds the second detail signal outputted from the analog-digital converter provided at the corresponding column based on a third pulse signal generated during a period from when the transfer signal outputted to the currently selected row turns to an inactive state to when the reset signal outputted to the next selected row turns to an active state.

According to the embodiments described above, it is possible to perform, by correlation double sampling, noise removal of a pixel signal obtained after A/D conversion and also to perform horizontal transfer of a digital pixel signal already subjected to the A/D conversion in parallel with the A/D conversion processing.

DETAILED DESCRIPTION

Figure 1:
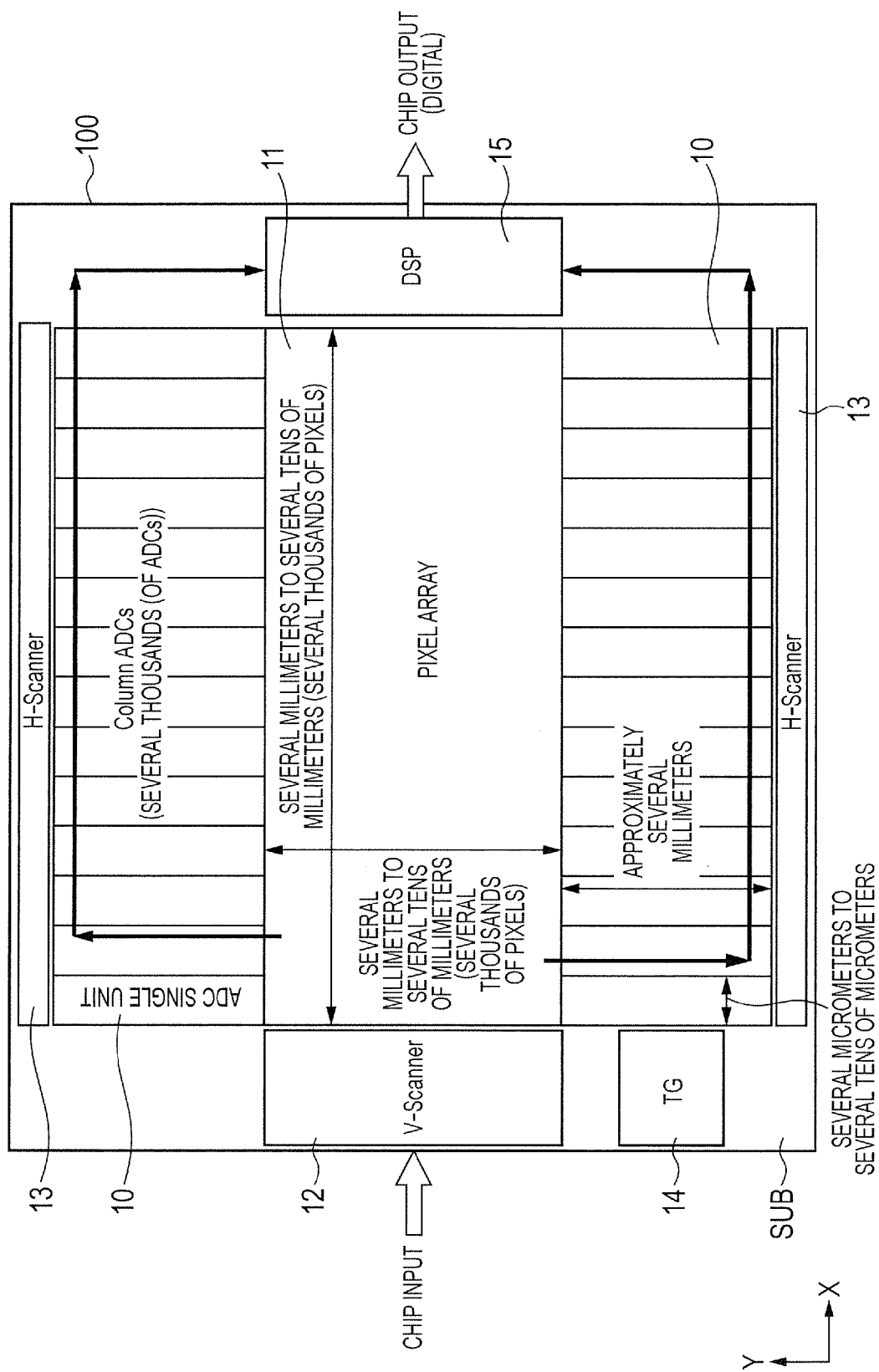
FIG. 1 is a plan view schematically showing the configuration of a solid-state image pickup device 100 according to a first embodiment of the present invention.

Hereinafter, embodiments of the present invention will be described in detail with reference to the accompanying drawings. The same or corresponding portions will be provided with the same reference numerals and their descriptions are not repeated.

<First Embodiment>[Configuration of Solid-State Image Pickup Device]

FIG. 1 is a plan view schematically showing the configuration of a solid-state image pickup device 100 according to the first embodiment of the present invention.

Figure 2:
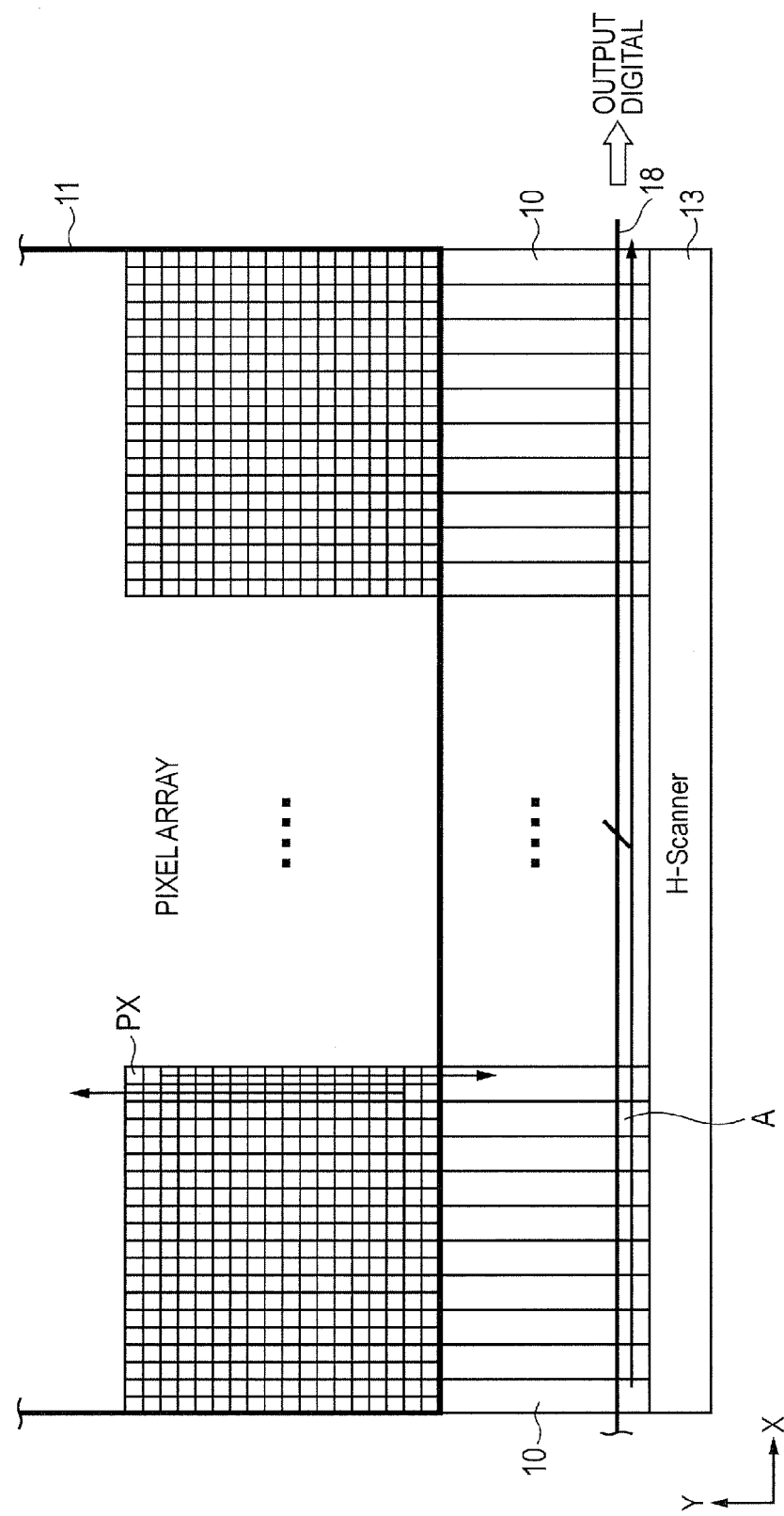
FIG. 2 is a plan view of enlarged portions of a pixel array 11 and column circuits 10 of the solid-state image pickup device 100.

FIG. 2 is a plan view of enlarged portions of a pixel array 11 and column circuits 10 of the solid-state image pickup device 100. Referring to FIGS. 1 and 2, the solid-state image pickup device 100 includes: the pixel array 11 having a plurality of pixels PXs arranged in a matrix form; a vertical scanning circuit (V-scanner) 12; a plurality of column circuits 10 respectively corresponding to columns of the pixel array 11; a horizontal scanning circuit (H-scanner) 13; a timing generator (TG) 14; and a digital signal processor (DSP) 15. In FIGS. 1 and 2, a direction along rows of the pixel array 11 is referred to as an X direction, a horizontal direction, or a right-and-left direction, and a direction along the columns thereof is referred to a Y direction, a vertical direction, or an up-and-down direction.

Figure 3:
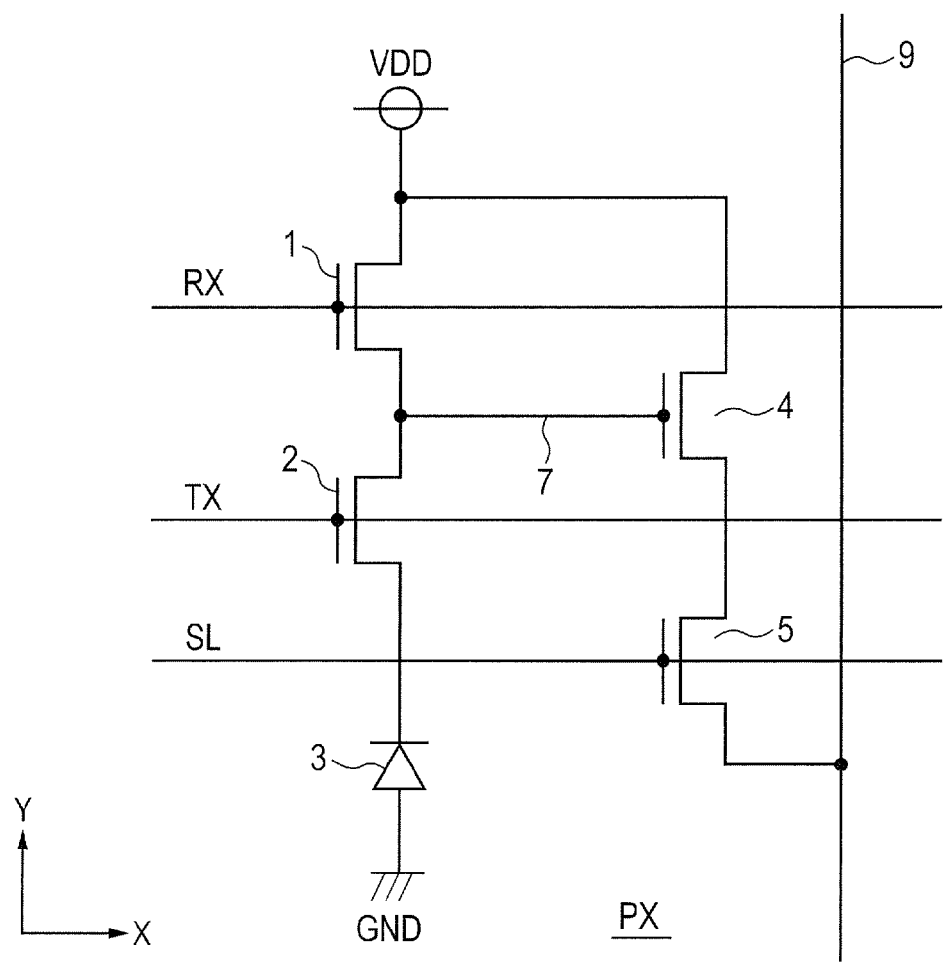
FIG. 3 is an electrically equivalent circuit diagram of each pixel PX.

The vertical scanning circuit (row selection circuit) 12 sequentially selects the row of the pixel array 11 and activates at predetermined timing control signals (a selection signal SL, a reset signal RX, and a transfer signal TX of FIG. 3) outputted to the pixels PX of the selected row.

The column circuits 10 are provided individually in correspondence with the columns of the pixel array 11, and subjects, to A/D conversion, signals transmitted from the corresponding columns of the pixel array 11 in accordance with the row selection of the vertical scanning circuit 12. More specifically, as described in FIGS. 4 and 5, the column circuit 10 includes: an A/D converter (ADC: Analog-to-Digital Converter) 20; and a register section (data holding section) 21 taking and temporarily holding a result of A/D conversion by the A/D converter 20. As shown in FIGS. 1 and 2, the column circuits 10 are arranged vertically with the pixel array 11 in between. The column circuits 10 corresponding to the odd-numbered rows of the pixel array 11 are arranged on one side of the vertical direction (the Y direction) with respect to the pixel array 11, and the column circuits 10 corresponding to the even-numbered rows are arranged on the other side of the vertical direction (the Y direction) with respect to the pixel array 11.

More specifically, the width and height of the pixel array 11 are each in approximately several millimeters to several tens of millimeters, and in this region, several thousands of rows and several thousands of columns are arranged. The width of each column circuit 10 is twice the width of one pixel, i.e., approximately several micrometers to several tens of micrometers. The height of each A/D conversion section is approximately several millimeters. Therefore, a shape of the column circuit 10 is a very slender shape. The column circuit 10 needs to be designed under this limitation, and thus a simple circuit configuration with a small area as well as power saving need to be achieved.

The horizontal scanning circuit (column selection circuit) 13 sequentially selects the columns of the pixel array 11. A digital signal held in the column circuit 10 corresponding to the selected column and obtained through the AD conversion is transferred to the digital signal processor 15 via an output bus 18 extending in the X direction.

The digital signal processor 15 performs signal processing on the digital signal transferred from the column circuit 10. In the digital signal processor 15, for example, image processing IP (Intellectual Property) is installed.

[Characteristics of Digital Image Sensor]

Hereinafter, typical characteristics of the digital image sensor with the configuration described above will be described in comparison to an analog image sensor. In the analog image sensor, each column circuit is provided with, for example, a column amplifier that amplifies an analog signal transmitted from a corresponding column, but is not provided with an A/D converter. The analog signal amplified by the column amplifier is outputted by scanning by the horizontal scanning circuit 13 to an AFE (Analog Front End) arranged outside of a chip. The AFE performs A/D conversion on the analog signal outputted from the analog image sensor.

In the case of an analog-type COMS image sensor, processing of performing A/D conversion on analog signals outputted from all the pixels is performed at the AFE outside of the chip, thus providing an advantage that characteristics of digital signals obtained by the A/D conversion are uniform. On the other hand, there is limitation on speed at which an analog signal is transferred from the analog image sensor to the outside of the AFE, and therefore the analog-type CMOS image sensor is not suitable for processing at a high frame rate such as moving images. There is also a drawback that the AFE needs to be designed.

In the case of the digital-type CMOS image sensor, digital transfer is performed by which a pixel signal subjected to the A/D conversion in the chip is outputted to the outside of the chip, thus making it possible to increase transfer speed. In this case, it is possible to use a data output I/F (Interface) such as an existing LVDS (Low Voltage Differential Signaling). Further, since the column circuits 10 are directly coupled to the pixel array 11, it is possible to achieve a design with low nose and high accuracy. There arises characteristic variation between the A/D converters at the different columns, but this variation can be removed by correlation double sampling.

[Pixel Configuration]

FIG. 3 is an electrical equivalent circuit diagram of each pixel PX. Referring to FIG. 3, each pixel PX includes: a photodiode (photoelectric conversion section) 3, a transfer transistor 2, a reset transistor 1, an amplifying transistor 4, a select transistor 5, and a floating diffusion (electric charge accumulation section) 7.

The photodiode 3 photoelectrically converts an optical signal into an electrical signal. The transfer transistor 2 is coupled to a cathode of the photodiode 3, and in accordance with the transfer signal TX, transmits photoelectric charges generated by the photodiode 3 to the floating diffusion 7. The reset transistor 1 initializes the floating diffusion 7 at a predetermined voltage level (supply voltage VDD level in the case of FIG. 3) in accordance with a reset signal RX. The amplifying transistor 4 outputs potential in accordance with an amount of electric charges on the floating diffusion 7 by a source follower circuit. The select transistor 5 transmits to a vertical reading line (column signal line) 9 a signal transmitted by the amplifying transistor 4 in accordance with the selection signal SL.

The transfer signal TX, the reset signal RX, and the selection signal SL are transmitted to the pixels PX at the selected row via a transfer signal line, a rest signal line, and a selection signal line, respectively, drawn from the vertical scanning circuit 12 of FIG. 1. The transfer signal line, the reset signal line, and the selection signal line are common for each pixel row. The vertical reading line 9 is coupled to the column circuit 10 at the corresponding column.

The transistors 1, 2, 4, and 5 described above are formed of N-channel MOS transistors as one example. In the case of the NMOS transistor, the transfer signal TX, the reset signal RX, and the selection signal SL are in an active state when they are at a high level (H-level) and are in an inactive state when they are at a low level (L-level).

There is also a configuration such that another photodiode is provided in parallel to the photodiodes 3 of each pixel PX of FIG. 3. In this case, two transfer transistors 2 are provided respectively in correspondence with the two photodiodes. The floating diffusion 7 and the other transistors 1, 4, and 5 are shared by the two photodiodes. Therefore, since the two photodiodes are provided in the pixel PX formed by the five transistors, and thus the configuration is typically called 2.5-transistor configuration. On the contrary, in the case of FIG. 3, one photodiode is provided in the pixel PX formed by the four transistors, and thus the configuration is called four-transistor configuration.

[Configuration of Column Circuit 10] (Schematic Configuration of Column Circuit 10)

Figure 4:
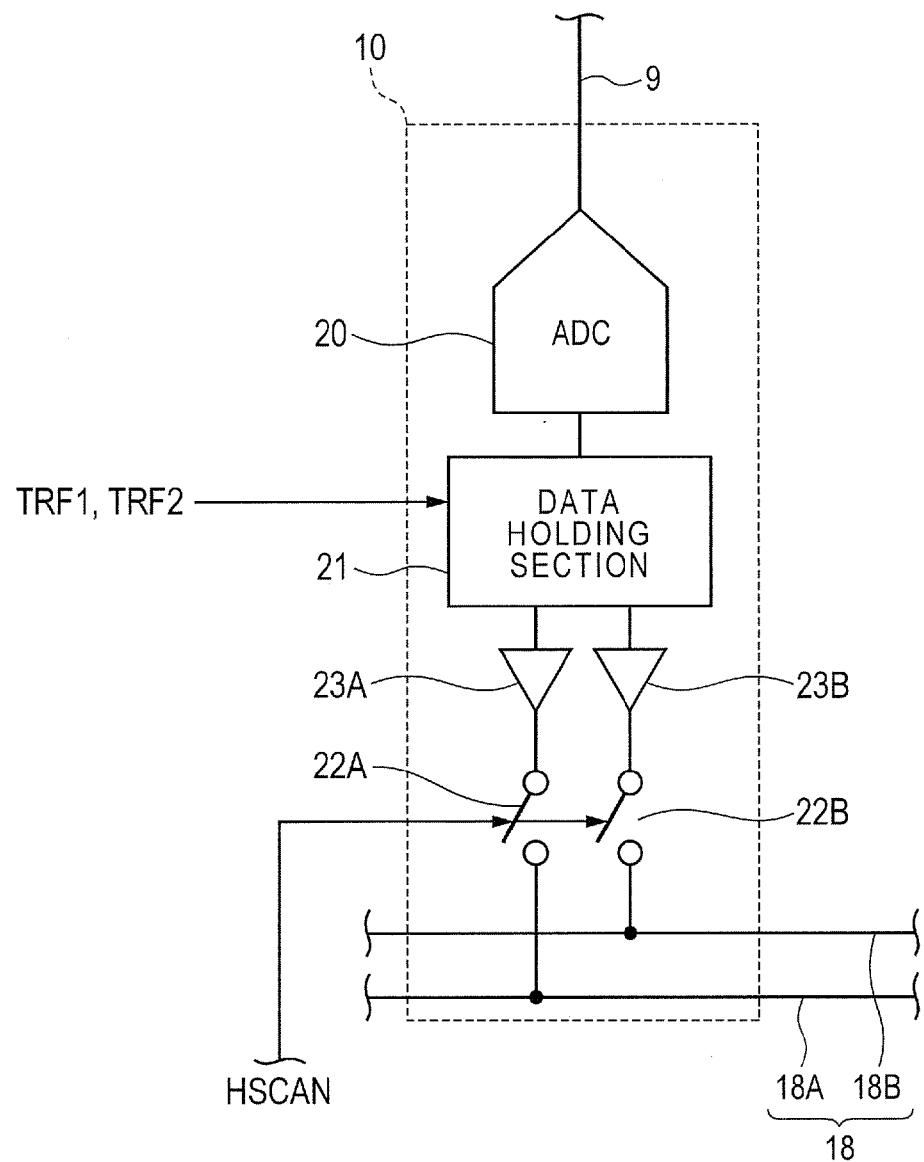
FIG. 4 is a schematic diagram showing the configuration of the column circuit 10.

FIG. 4 is a schematic diagram showing the configuration of the column circuit 10. Referring to FIG. 4, the column circuit 10 includes: an A/D converter 20 that performs A/D conversion on an analog signal transmitted from, of the pixels at the selected row, the pixel at the corresponding column; a register section 21; switching elements 22A and 22B; and buffers 23A and 23B. The register section 21, based on timing signals TRF1 and TRF2 generated by the timing generator 14 of FIG. 1, takes in and holds a result of the A/D conversion by the A/D converter 20. The switching elements 22A and 22B switch between ON and OFF in response to a column selection signal HSCAN generated by the horizontal scanning circuit 13 of FIG. 1. When the switching elements 22A and 22B are in an ON state, digital signals (a pixel reset signal RST and a pixel signal SIG to be described below) held at the register section 21 are formed by the buffers 23A and 23B, respectively, and are then transferred to the digital signal processor 15 of FIG. 1 via the output buses 18A and 18B, respectively.

Note that, although not shown in FIG. 4, at a stage before the A/D converter 20, an amplifier may be provided which amplifies an analog signal outputted from each pixel at the corresponding row.

(Configuration and Operation of A/D Converter 20)

Figure 5:
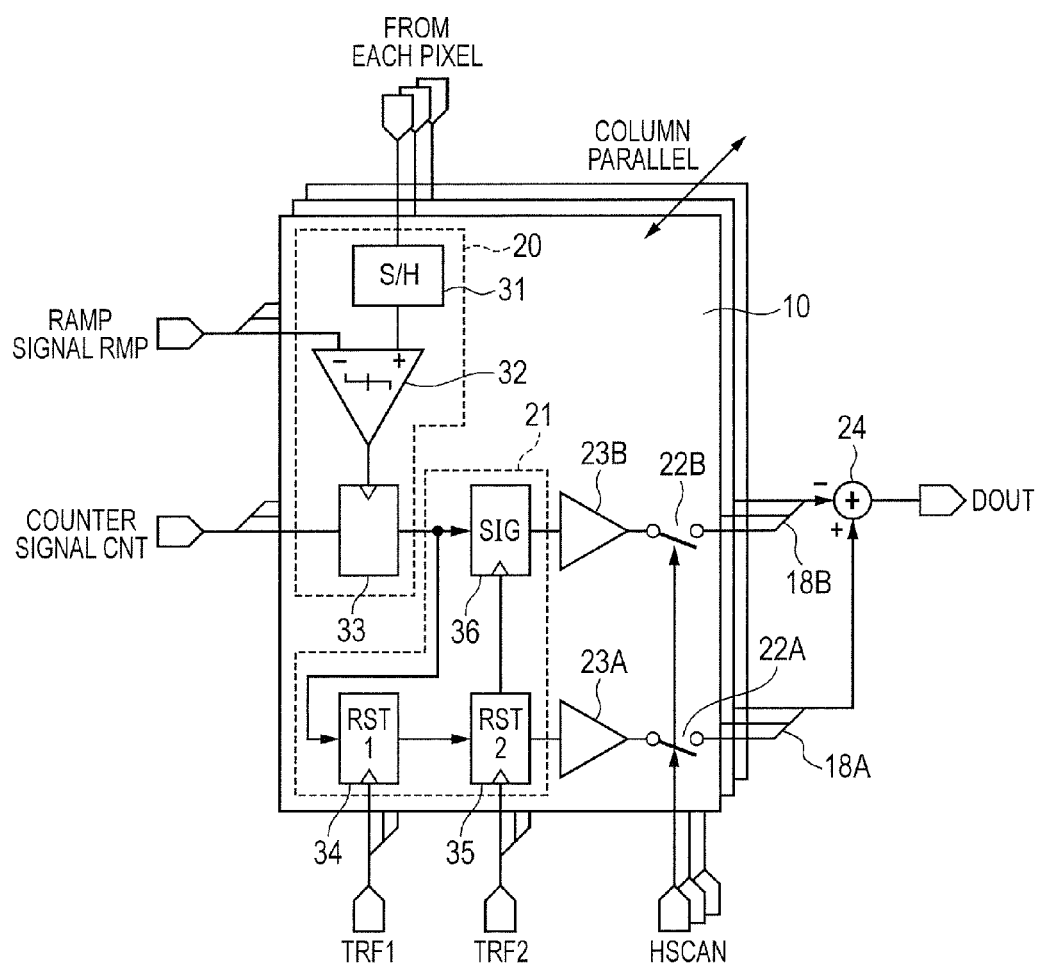
FIG. 5 is a diagram showing the configuration of the column circuit 10 of FIG. 4 in more detail.

FIG. 5 is a diagram showing the configuration of the column circuit 10 of FIG. 4 in more detail. The column circuits 10 are respectively provided in parallel (column parallel) to columns of the pixel array 11. As shown in FIG. 5, in the case of the first embodiment, an integral-type converser is used as the A/D converter 20. Hereinafter, referring to FIGS. 6 and 7, the configuration and the operation of the integral-type A/D converter 20 will be described.

Figure 6:
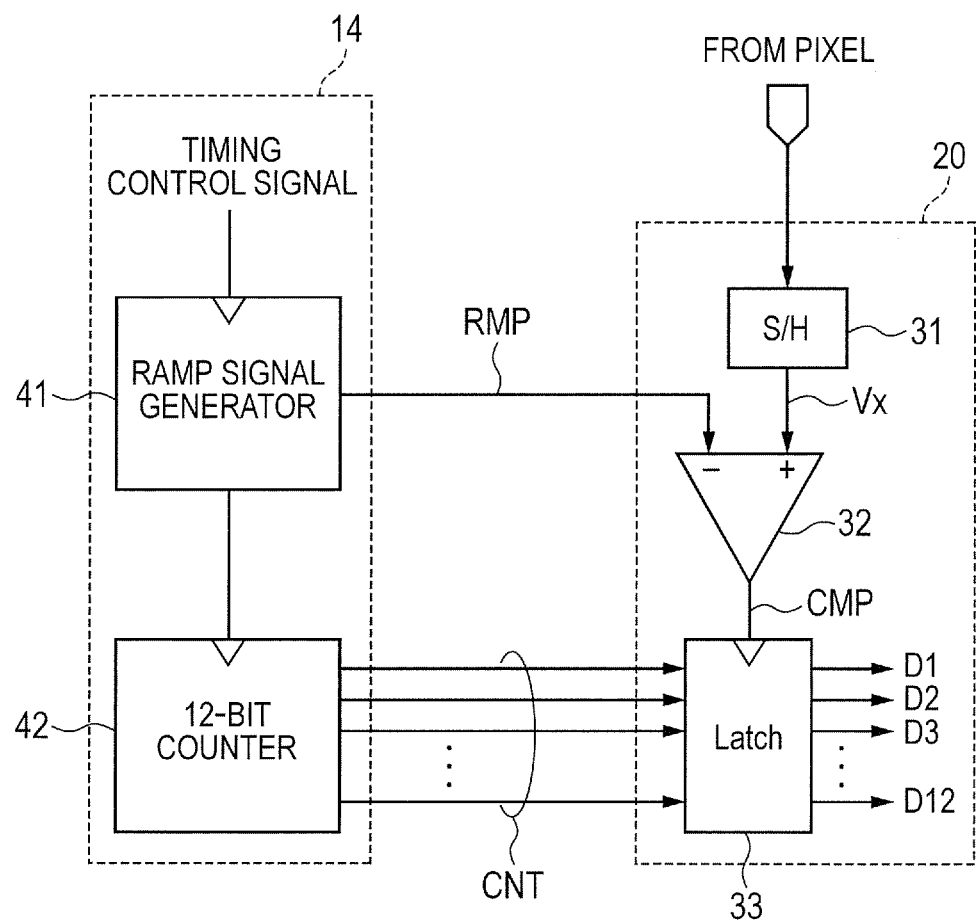
FIG. 6 is a block diagram showing the configuration of an A/D converter 20 of an integral type.

FIG. 6 is a block diagram showing the configuration of the integral-type A/D converter 20. Referring to FIG. 6, the A/D converter 20 includes a sample/hold (S/H) circuit 31, a comparator 32, and a latch circuit 33. In the case of FIG. 6, the latch circuit 33 is a multi-bit D latch circuit of a high-through type.

The sample/hold circuit 31 sample-holds an analog signal outputted from the corresponding pixel at the selected row.

The comparator 32 compares an analog signal Vx held at the sample/hold circuit 31 and a ramp signal RMP. Here, the ramp signal RMP is a signal whose voltage level gradually increases from 0 at a constant increasing rate and which is generated by a ramp signal generator 41 provided at the timing generator 14 of FIG. 1. If voltage of the analog signal Vx exceeds the voltage of the ramp signal RMP, the comparator 32 outputs a high level (H-level) signal. Therefore, an output signal CMP of the comparator 32 has a pulse width proportional to the voltage of the analog signal Vx.

The latch circuit 33, at a falling edge of the output signal of the comparator 32, takes in and holds a counter signal CNT outputted from a counter 42 provided at the timing generator 14 of FIG. 1. The counter 42 performs count-up in synchronization with the ramp signal RMP. For example, a 12-bit counter 42 increases a digital value from o to 4096 during a period (for example, 10 μs) in which the ramp signal increases. The counter signal CNT (least significant bit D1 to most significant bit D) taken in by the latch circuit 33 serves as a result of the AD conversion of the analog signal read from the pixel.

Figure 7:
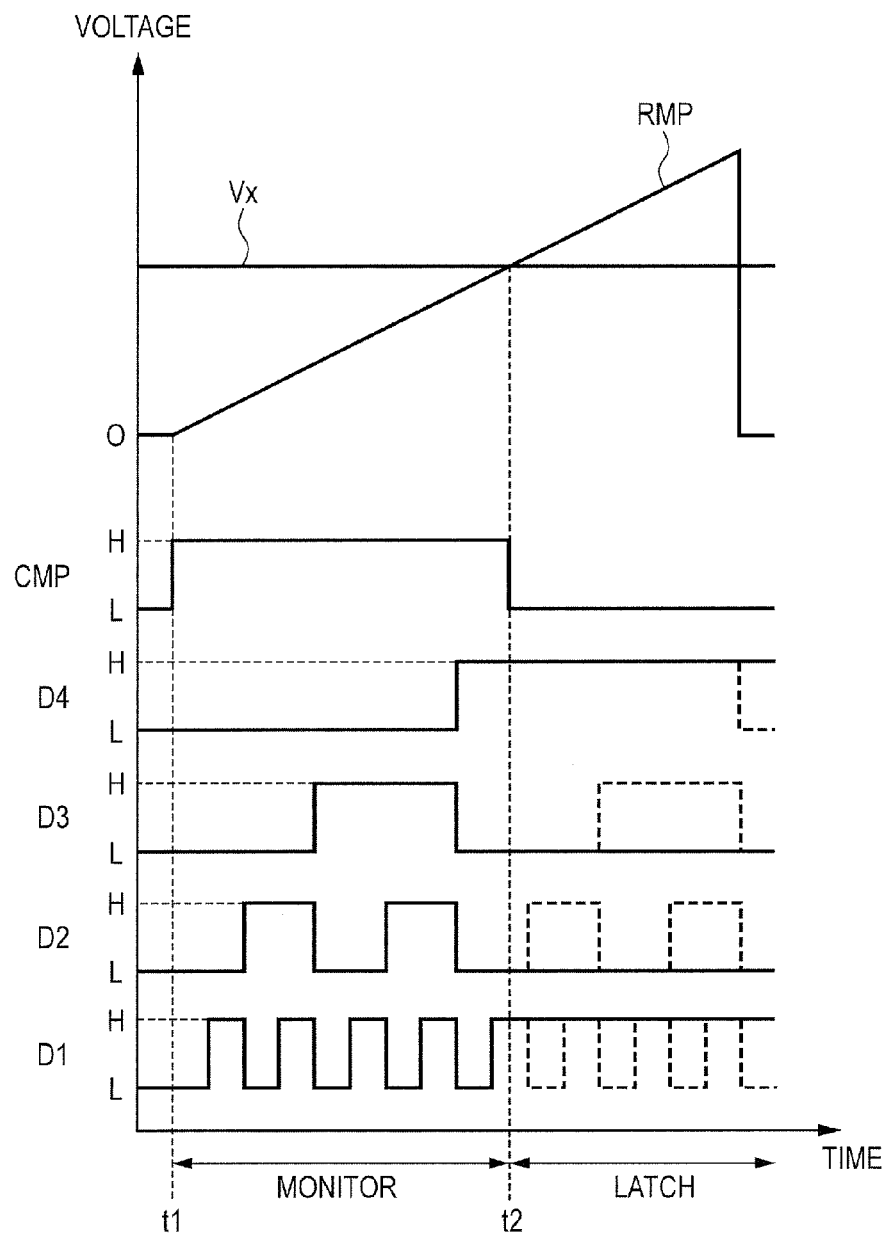
FIG. 7 is a timing diagram showing one example of voltage waveforms of respective parts of FIG. 6.

FIG. 7 is a timing diagram showing one example of voltage waveforms of the various sections of FIG. 6. Shown in FIG. 7 are: in order from the top, the analog signal Vx outputted from the sample/hold circuit 31, the ramp signal RMP, the output signal CMP of the comparator 32, and output signals (four lower bits D4 to D1) of the latch circuit 33.

Referring to FIGS. 6 and 7, at time t1, in response to a timing control signal generated based on a clock signal, the ramp signal generator 41 starts voltage increase of the ramp signal RMP. In response to this timing control signal, the counter 42 starts count-up.

At time t2, if the voltage level of the ramp signal RMP exceeds the voltage level of the output signal Vx of the sample/hold circuit 31, the output signal CMP of the comparator 32 falls down to a low level (L-level). The latch circuit 33, at this falling edge, takes in output of the counter 42 and holds it as a result of A/D conversion. Specifically, during a period from the time t1 to time t2, the latch circuit 33 is in a monitor state in which it directly passes the counter signal CNT, and at and after the time t2, the latch circuit 33 is in a latched state in which a value of the counter signal CNT taken in at a time point of the time t2 is held. More specifically, in the case of FIG. 7, the result of the A/D conversion is "1001"

(Configuration and Operation of Register Section 21)

Referring to FIG. 5 again, the register section 21 includes first to third latch circuits 34, 35, and 36. In the case of FIG. 5, each of the first to third latch circuits 34, 35, and 36 is a multi-bit D latch circuit of a high-through type.

The first latch circuit 34, at a falling edge at which a first timing signal TRF1 changes from an H-level to an L-level, takes in and holds the result of the A/D conversion by the A/D converter 20 (data held in the latch circuit 33). The second latch circuit 35, at a falling edge at which a second timing signal TRF2 changes from an H-level to an L-level, takes in and holds data held in the first latch circuit 34. The third latch circuit 36, at a falling edge at which the second timing signal TRF2 changes from an H-level to an L-level, takes in and holds the result of the A/D conversion by the A/D converter 20 (the data held in the latch circuit 33).

Note that in this specification, when the timing signals TRF1 and TRF2 are at H-levels, pulse signals TRF1 and TRF2 are generated. The first and second latch circuits 34 and 35 (36) respectively pass through signals inputted when the pulse signals TRF1 and TRF2 are being generated, and take in and hold a signal inputted instantaneously upon disappearance of the pulse signals TRF1 and TRF2.

Data held in the second and third latch circuits 35 and 36 are transferred to a circuit at a later stage when the switch elements 22A and 23B are in an ON state in accordance with the column selection signal HSCAN. More specifically, the data held in the second and third latch circuits 35 and 36 are respectively formed by the buffers 23A and 23B, and outputted to a computing section 24 via the output buses 18A and 18B. The computing section 24 is provided in the digital signal processor 15 of FIG. 1, calculates a difference of the inputted digital signals, and outputs a calculated difference signal DOUT.

[Operation of Solid-State Image Pickup Device 100]

Figure 8:
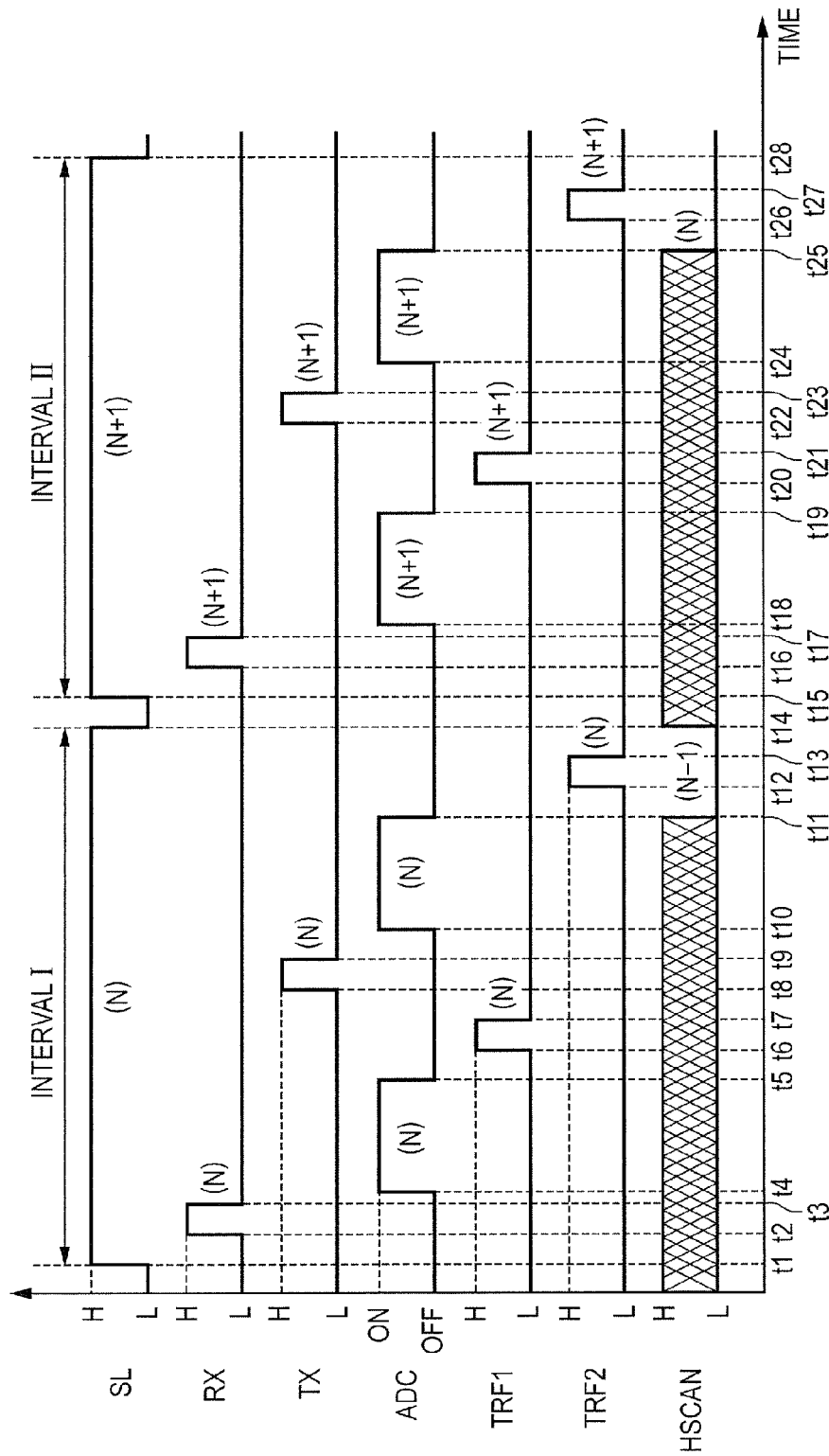
FIG. 8 is a timing diagram of the solid-state image pickup device 100 according to the first embodiment.

FIG. 8 is a timing diagram of the solid-state image pickup device 100 according to the first embodiment. Referring to FIGS. 3, 5, and 8, the operation of the solid-state image pickup device 100 will be described.

In FIG. 8, at an interval I from time t1 to time t14, the N-th row of the pixel array 11 of FIG. 1 is selected, and at an interval II from time t15 to time t28, the (N+1)-th row of the pixel array 11 is selected. That is, at the interval I, the selection signal SL outputted to each pixel at the N-th row from the vertical scanning circuit 12 of FIG. 1 turns to an H-level, and at the interval II, the selection signal SL outputted to each pixel at the (N+1)-th row from the vertical scanning circuit 12 turns to an H-level.

(Operation at Interval I)

At the interval I, during a period from the time t2 to the time t3, the reset signal RX outputted to each pixel PX at the N-th row turns to an H-level (active state). As a result, the floating diffusion 7 of each pixel PX at the N-th row is initialized. In this specification, in accordance with an amount of electric charges of the floating diffusion 7 in the initial state, a signal outputted from the amplifying transistor 4 to the vertical reading line 9 is referred to as a pixel reset signal.

During the next period from the time t4 to the time t5, the pixel reset signal outputted from the amplifying transistor 4 is sample-held by the sample/hold circuit 31 provided at each column circuit 10, and the sample-held pixel reset signal is subsequently subjected to A/D conversion by the A/D converter 20.

During the next period from the time t6 to the time t7, the first timing signal TRF1 turns to an H-level (that is, the pulse signal TRF1 is generated). At the time t7, at which the first timing signal TRF1 switches from the H-level to an L-level (that is, the pulse signal TRF1 disappears), the first latch circuit 34 takes in and holds the pixel reset signal RST obtained through he A/D conversion by the A/D converter 20.

The rising time t6 and the falling time t7 of this first timing signal TRF1 (that is, the generation of the pulse signal TRF1) are set so as to come behind the time t5 at which the A/D conversion by the A/D converter 20 completes during a period from when the reset signal RX outputted to each pixel at the N-th row switches to an L-level to when the transfer signal TX outputted to each pixel at the N-th row switches to an H-level.

During the next period from the time t8 to the time t9, the transfer signal TX outputted to each pixel PX at the N-th row turns to an H-level (active state). As a result, at each pixel PX at the N-th row, photoelectric charges generated at the photodiode 3 are transmitted to the floating diffusion 7. A signal outputted from the amplifying transistor 4 to the vertical reading line 9 in accordance with an amount of charges of the floating diffusion 7 already subjected to photoelectric charge transfer is referred to as a pixel signal.

During the next period from the time t10 to the time t11, a pixel signal outputted from the amplifying transistor 4 is sample-held by the sample/hold circuit 31 provided at each column circuit 10, and the sample-held pixel signal is subsequently subjected to A/D conversion by the A/D converter 20.

During the next period from the time t12 to the time t13, the second timing signal TRF2 turns to an H-level (that is, the pulse signal TRF2 is generated). At the time t13 at which the second timing signal TRF2 switches from the H-level to an L-level (that is, the pulse signal TRF2 disappears), the second latch circuit 35 takes in and holds the pixel reset signal RST held at the first latch circuit 34. At the time t13, the third latch circuit 36 further takes in and holds a pixel signal SIG obtained through the A/D conversion by the A/D converter 20.

The rising time t12 and the falling time t13 of this second timing signal TRF2 (that is, the generation of the pulse signal TRF2) are set so as to come behind the time t11 at which the A/D conversion by the A/D converter 20 completes during a period from when the transfer signal TX outputted to each pixel at the N-th row switches to an L-level to when the reset signal RX outputted to each pixel at the (N+1)-th row switches to an H-level.

Note that operation of data taking from the second and third latch circuits 35 and 36 may be performed at different timing. In this case, the timing generator 14 of FIG. 1 generates a different timing signal from the second timing signal TRF2 inputted to a clock terminal of the second latch circuit 35, and then inputs it to a clock terminal of the third latch circuit 36. Rising time and falling time of this different timing signal are also set so as to come behind the time t11 at which the A/D conversion by the A/D converter 20 completes during the period from when the transfer signal TX outputted to each pixel at the N-th row switches to an L-level to when the reset signal RX outputted to each pixel at the (N+1)-th row switches to the H-level.

The A/D conversion operation and the operation of take-in into the latch circuit at the interval I described above are executed in parallel on an individual column basis. Further, in parallel with processing of the signals outputted from each pixel at the N-th row, in correspondence with each pixel at the (N−1)-th row, the pixel reset signal RST and the pixel signal SIG held at the second and third latch circuits 35 and 36 are transferred to the computing section 24. This transfer operation is performed in accordance with the column selection signal HSCAN outputted from the horizontal scanning circuit 13 of FIG. 1, and is sequentially executed on an individual column basis until the time t12 at which the pulse signal TRF2 for taking the result of the A/D conversion on the signal outputted from each pixel at the N-th row into the second and third latch circuits 35 and 36 is generated. The computing section 24 sequentially calculates and outputs a difference between the transferred pixel reset signal RST and pixel signal SIG.

(Operation at Interval II)

The operation at the interval II is the same as the operation at the interval I, and thus it is briefly described below. First, during a period from the time t16 to the time t17, the reset signal RX outputted to each pixel PX at the (N+1)-th row turns to an H-level (active state). As a result, the floating diffusion 7 of each pixel PX at the (N+1)-th row is initialized.

During the next period from the time t18 to the time t19, the pixel reset signal having voltage in accordance with the amount of electric charges of the floating diffusion 7 in the initial state is subjected to A/D conversion by the A/D converter 20.

Then at the time t21 at which the first timing signal TRF1 switches from the H-level to an L-level, the first latch circuit 34 takes in and holds the pixel reset signal RST obtained through the A/D conversion by the A/D converter 20.

During the next period from the time t22 to the time 23, the transfer signal TX outputted to each pixel PX at the (N+1)-th row turns to an H-level (active state). As a result, at each pixel PX at the (N+1)-th row, electric charges generated at the photodiode 3 are transmitted to the floating diffusion 7.

During the next period from the time t24 to the time t25, the pixel signal having the voltage in accordance with the amount of the electric charges transmitted from the photodiode 3 is subjected to A/D conversion by the A/D converter 20.

Then at the time t27 at which the second timing signal TRF2 switches from the H-level to an L-level, the second latch circuit 35 takes in and holds the pixel reset signal RST held by the first latch circuit 34, and also the third latch circuit 36 takes in and holds the pixel signal SIG obtained through the A/D conversion and outputted from the A/D converter 20.

The A/D conversion operation and the operation of take-in into the latch circuits at the interval II described above are executed in parallel on an individual column basis. Further, in parallel with processing of A/D conversion on signals outputted from each pixel at the (N+1)-th row, the pixel reset signal RST and the pixel signal SIG held in the second and third latch circuits 35 and 36 and obtained through the A/D conversion are transferred to the computing section 24 based on the signal outputted from each pixel at the N-th row. The computing section 24 sequentially calculates and outputs a difference between the transferred pixel reset signal RST and pixel signal SIG.

[Integration Time of Pixel Reset Signal]

In a timing diagram of FIG. 8, the time (the time t4 to the time t5) for A/D conversion of the pixel reset signal can be shorter than time (the time t10 to the time t11) for A/D conversion of the pixel signal. The reason will be described below.

Figure 9:
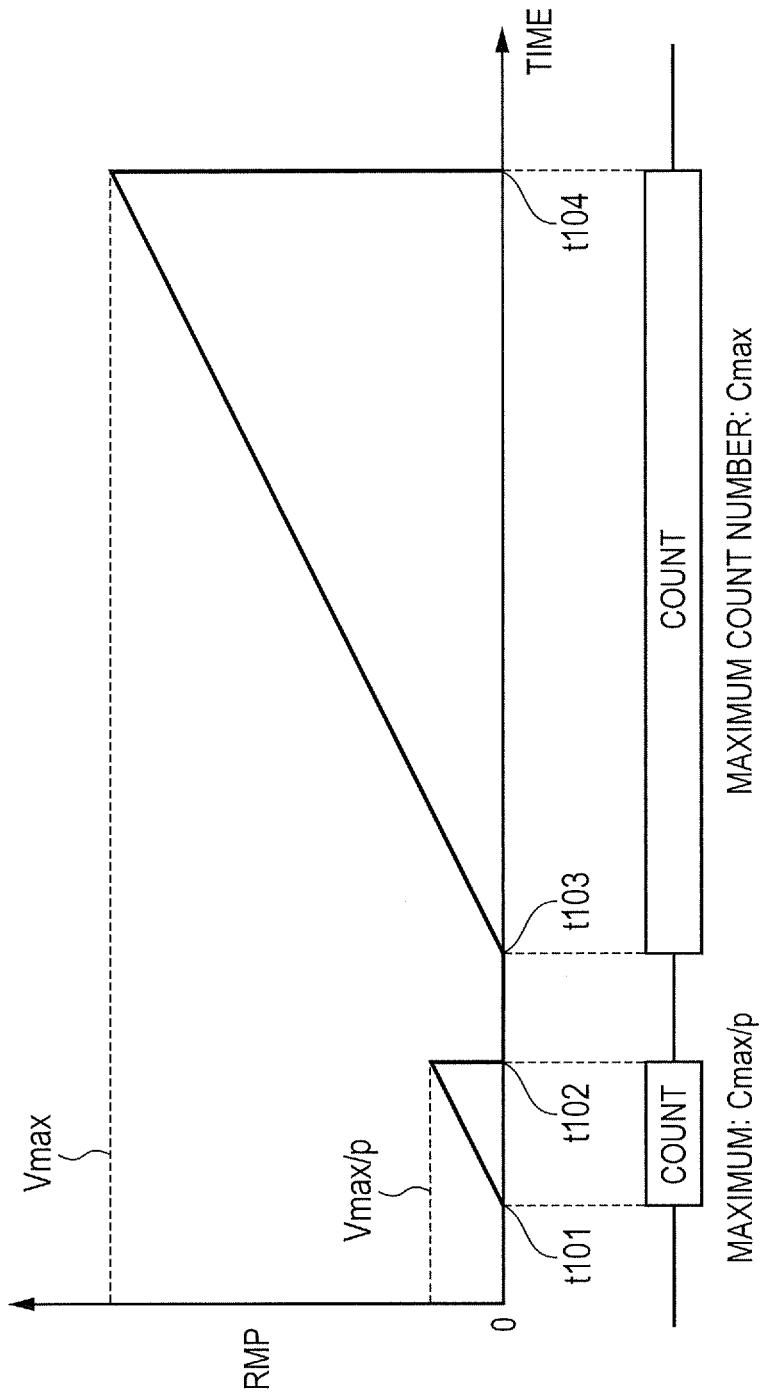
FIG. 9 is a waveform chart of a ramp signal RMP.

FIG. 9 is a waveform diagram of the ramp signal RMP. In FIG. 9, the waveform from time t101 to time t102 shows a waveform of the ramp signal RMP applied at time of the A/D conversion of the pixel reset signal, and the waveform from time t103 to time t104 shows a waveform of the ramp signal RMP applied at time of the A/D conversion of the pixel signal.

Upon A/D conversion of a pixel signal corresponding to the photoelectric charges transferred from the photodiode 3 to the floating diffusion 7, it is required to use a maximum count number Cmax of the counter and also use a ramp signal of a sufficiently large amplitude Vmax.

On the contrary, the pixel reset signal corresponding to the amount of electric charges of the floating diffusion 7 in the initial state fluctuates only in a range of fixed pattern noise and random noise, and thus this fluctuation is limited to a relatively small range. Therefore, amplitude of the ramp signal RMP in the A/D conversion of the pixel reset signal can be small and the count number can also be small.

More specifically, in the case of the pixel reset signal, assuming that a maximum count number (Cmax/P) and amplitude (Vmax/P) that are 1/p times those of the pixel signal are satisfactory, time for the A/D conversion of the pixel reset signal may be 1/p times time for the A/D conversion of the pixel signal. Therefore, even when digital noise cancellation is performed, entire signal processing time can be increased by some ratio of entire signal processing time in a case where the noise cancellation is not performed.

[Effects of Solid-State Image Pickup Device according to First Embodiment]

The effects of the solid-state image pickup device 100 according to the first embodiment will be described while summarizing the above description.

(Realization of High-Speed Signal Processing)

The most significant problem in the CMOS image sensor is a very large data processing volume due to conversion of pixel information into a digital value. For example, assume an example in which 10000-pixel data is processed at a typical moving image processing rate (30 fps). In this case, where the processing is simply performed by one A/D converter, 1-pixel information (for example, 4096 tones) needs to be subjected to A/D conversion for data transfer in 3 ns, which is impractical.

In the solid-state image pickup device 100 according to the first embodiment, as shown in FIGS. 1 and 2, the A/D converters are arrayed as the column circuits 10 in a column form. Therefore, for example, assuming that a 10000000-pixel image sensor is composed of 3900 horizontal pixels and 2600 vertical pixels, a maximum of 12.8 μs per pixel is permitted for the A/D conversion and the data transfer.

Further, in the solid-state image pickup device 100 according to the first embodiment, executing the data transfer in background of the A/D conversion can prolong time permitted for the A/D conversion and the data transfer, permitting efficient processing of a very large data volume.

More specifically, as described in FIGS. 5 and 8, the pixel reset signal RST obtained through the A/D conversion is taken into the first latch circuit 34 based on the pulse signal TRF1, and is further transferred to the second latch circuit 35 at a later stage based on the pulse signal TRF2. The pixel signal SIG obtained through the A/D conversion is taken into the third latch circuit 36 based on the pulse signal TRF2. The pixel reset signal RST and the pixel signal SIG held by these second and third latch circuit 35 and 36 are sequentially read out on an individual column basis in accordance with the column selection signal HSCAN by the time at which the pulse signal TRF2 is generated for taking, into the second and third latch circuits 35 and 36, the pixel reset signal and the pixel signal already obtained through the A/D conversion corresponding to each pixel at the next selected row.

Further, a difference between the pixel reset signal and the pixel signal sequentially read out on an individual column basis is calculated by the computing section 24 mounted in the chip. Executing the subtraction in the chip in this manner can reduce the volume of data outputted to outside of the chip and thus can lower a rate of data transfer to the outside of the chip.

(Realization of Pixel Signal with Low Noise)

In a case where the A/D converter is provided for each column, upon occurrence of offsetting at time of the A/D conversion, there arises a problem that characteristics differ from one column to another. To remove such offsetting caused by the A/D conversion, so-called noise cancellation by correlation double sampling is executed in a digital region in the solid-state image pickup device 100 according to the first embodiment.

More specifically, the pixel reset signal corresponding to the amount of electric charges of the floating diffusion 7 in the initial state and the pixel signal corresponding to the amount of electric charges of the floating diffusion 7 already subjected to photoelectric transfer from the photodiode 3 are each subjected to A/D conversion. Then a difference between the pixel reset signal obtained through the A/D conversion and the pixel signal obtained through the A/D conversion is calculated and read data for each final pixel is obtained.

Performing such digital noise cancellation also permits removal of fixed pattern noise which is a problem especially for the CMOS image sensor.

(Comparison with Other Configuration)

Referring to FIG. 5, to realize the digital noise cancellation, a possible configuration is such that two latch circuits 33 (first and second latch circuits 33A and 33B) receiving the counter signal CNT in the A/D converter 20 are provided. In this case, the first latch circuit 33A is used for A/D conversion of the pixel reset signal read out from each pixel, and the second latch circuit 33B is used for A/D conversion of the pixel signal read out from each pixel. Therefore, in this configuration, only the second and third latch circuits 35 and 36 need to be provided inside of the register section 21, and the first latch circuit 34 is no longer required. The second latch circuit 35, upon falling of the second timing signal TRF2, takes in and holds the pixel reset signal RST transferred from the first latch circuit 33A in the A/D converter 20 and obtained through the A/D conversion. The third latch circuit 36, upon falling of the second timing signal TRF2, takes in and holds the pixel signal SIG transferred from the second latch circuit 33B in the A/D converter 20 and obtained through the A/D conversion.

Even with such configuration, it is possible to perform the digital noise cancellation and horizontal data transfer on the background of the A/D conversion processing. The reason for this will be described below.

In the case of the A/D converter of an integral type described in FIG. 6, length of wiring from the timing generator 14 where the counter 42 is provided to each column circuit 10 is very long, thus resulting in high wiring impedance. Thus, rounding (corner rounding) occurs in a waveform of the counter signal CNT inputted to each column circuit 10, thus consequently causing offset voltage in the output signal of the A/D converter. In a case where the latch circuits 33 receiving the counter signal CNT are divided for the pixel reset signal RST and for the pixel signal SIG, this offset voltage greatly differs between the latch circuits 33A and 33B. Therefore, even subtracting the pixel reset signal RST from the pixel signal SIG does not cancel the offset voltage.

On the contrary, in the case of the first embodiment, as shown in the configuration of the A/D converter 20 of FIG. 5, the latch circuits 33 receiving the counter signal CNT are commonly used for the pixel reset signal and the pixel signal. Thus, calculating by the computing section 24 a difference between the pixel reset signal RST and the pixel signal SIG obtained through the A/D conversion permits removal of the offset voltage caused in the output of the A/D converter.

<Second Embodiment>

Figure 10:
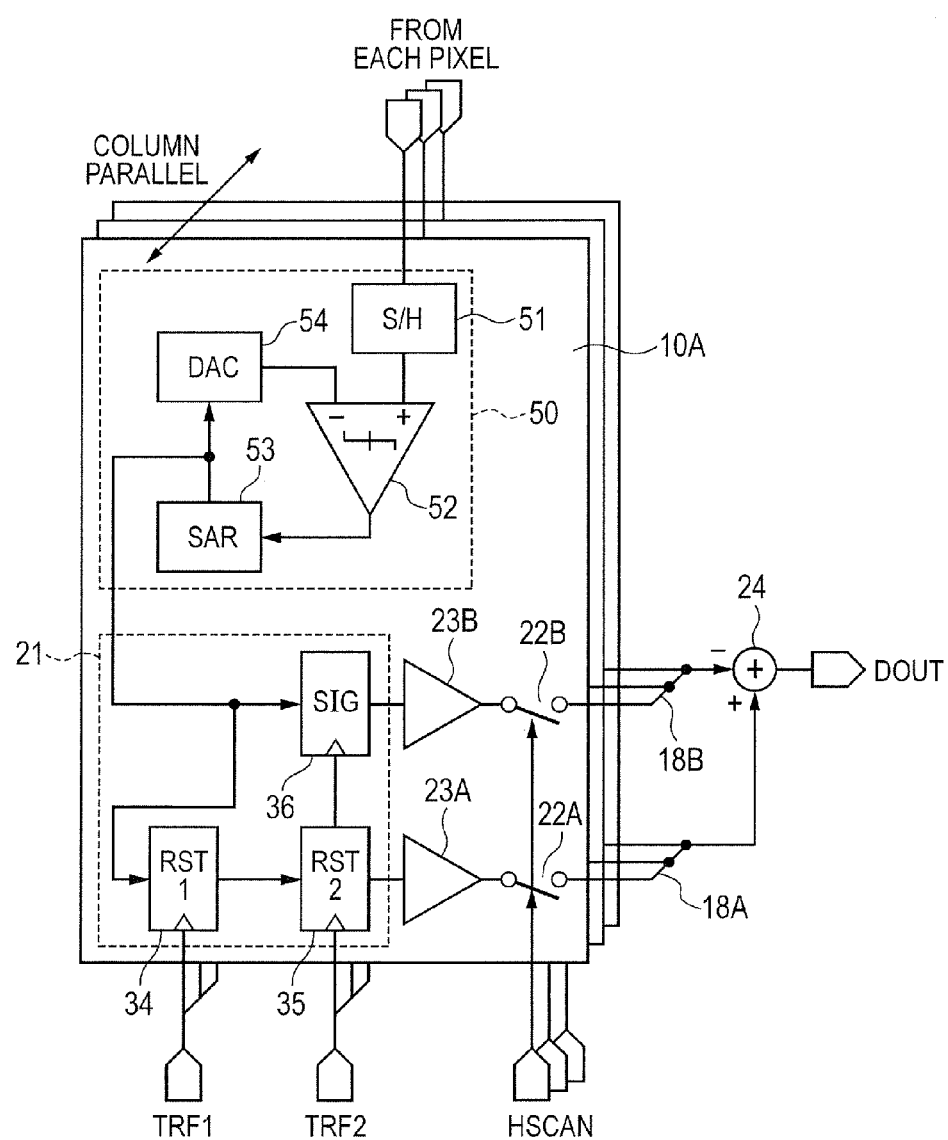
FIG. 10 is a block diagram showing configuration of a column circuit 10A applied to a solid-state image pickup device according to a second embodiment of the present invention.

FIG. 10 is a block diagram showing configuration of a column circuit 10A applied to a solid-state image pickup device according to the second embodiment of the present invention. The column circuit 10A of FIG. 10 differs from the column circuit 10 of FIG. 5 in that the column circuit 10A is provided with an A/D converter 50 of a successive-approximation type instead of the A/D converter 20 of an integral type. Other points of FIG. 10 are the same as those of FIG. 5, and the same or corresponding portions are provided with the same numerals and their repeated description will be omitted.

Referring to FIG. 10, the A/D converter 50 of a successive-approximation type includes: a sample-hold (S/H) circuit 51, a comparator 52, a successive-approximation resister (SAR) 53, and a digital-to-analog (D/A) converter 54. Analog signals (a pixel reset signal and a pixel signal) inputted from the pixel at the selected row of the corresponding column are sample-held by the sample/hold circuit 51.

The SAR 53, at the beginning of the A/D conversion, sets the most significant bit (MSB) at "1", and outputs a digital signal "10 . . . 0". The output of the SAR 53 is subjected to D/A conversion by the D/A converter 54 and outputted to the comparator 52. The comparator 52 compares the analog signal held in the sample-hold circuit 51 and the output of the D/A converter 54. As a result of this, if the output of the sample-hold circuit 51 is equal to or smaller than the output of the D/A converter 54 (that is, the output of the comparator 52 is "0"), the SAR 53 returns the MSB to "0", sets the next bit at "1", and outputs a digital signal "010 . . . 0". The comparator 52 compares the output of the sample-hold circuit 51 with a result of the D/A conversion as an output signal of the SAR 53 again.

On the other hand, if the output of the sample-hold circuit 51 is larger than the result of the D/A conversion of the digital signal "10 . . . 0" (that is, if the output of the comparator 52 is "1"), the SAR 53 sets the next bit at "1" while keeping the MSB at "1", and outputs a digital signal "110 . . . 0". The comparator 52 compares the output of the sample-hold circuit 51 with the result of the D/A conversion as the output signal of the SAR 53 again.

As described above, values of all the bits from the most significant bit (MSB) to the least significant bit (LSB) are determined. The determined values of all the bits are taken into the first latch circuit 34 based on the pulse signal TRF1 or taken into the third latch circuit 36 based on the pulse signal TRF2.

Even with the solid-state image pickup device including the A/D converter 50 of a successive-approximation type described above, as is the case with the first embodiment, it is possible to perform, by the correlation double sampling, noise removal of the digital pixel signal obtained through the A/D conversion, and also to perform horizontal transfer of the digital pixel signal already subjected to the A/D conversion in parallel to the A/D conversion processing. As a result, high-speed signal processing with high accuracy can be performed, thus providing an image signal of high quality.

Note that, as described in the first embodiment, operation of data taking of the second and third latch circuits 35 and 36 may be performed at different timing. In this case, a timing signal different from the second timing signal TRF2 inputted to the clock terminal of the second latch circuit 35 is generated by the timing generator 14 and is inputted to the clock terminal of the third latch circuit 36.

<Third Embodiment>

Figure 11:
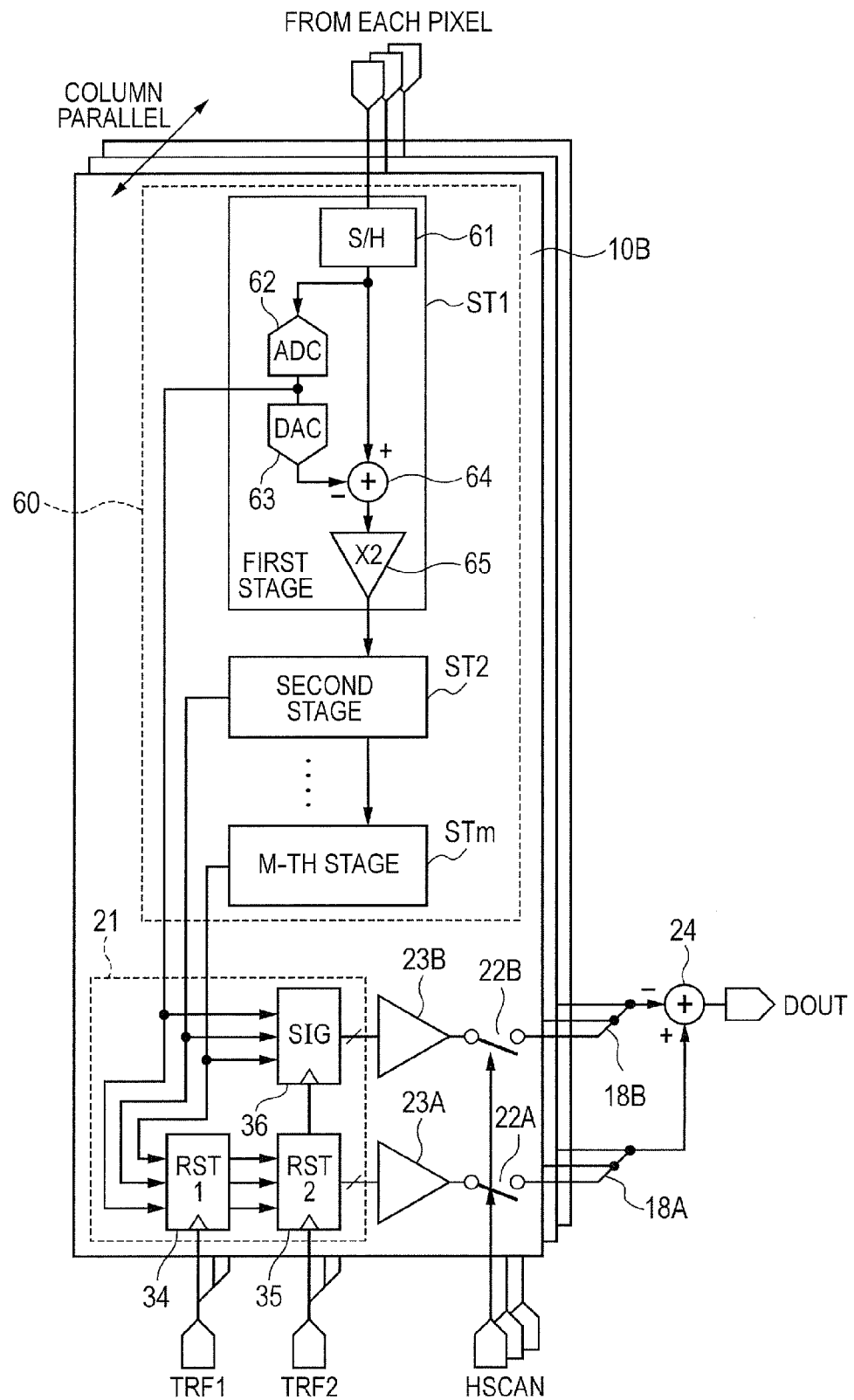
FIG. 11 is a block diagram showing the configuration of a column circuit 10B applied to a solid-state image pickup device according to a third embodiment of the present invention.

FIG. 11 is a block diagram showing the configuration of a column circuit 10B applied to a solid-state image pickup device according to the third embodiment of the present invention. The column circuit 10B of FIG. 11 is different from the column circuit 10 of FIG. 5 in that an A/D converter 60 of a pipeline type is provided instead of the A/D converter 20 of an integral type.

Referring to FIG. 11, the A/D converter 60 of a pipeline type includes m-number of stages ST1 to STm. Each stage ST includes: a sample-hold (S/H) circuit 61; a one-bit A/D converter 62, a one-bit D/A converter 63, a computing section 64, and an amplifier 65. The computing section 64 subtracts, from an analog signal held in the S/H circuit 61, a result of one-bit A/D conversion performed on this analog signal (note that this is the one converted again to an analog signal by the one-bit D/A converter 63) and outputs it. The amplifier 65 doubles the output of the computing section 64 and outputs it to the later stages. A result of A/D conversion at each stage is taken into the first latch circuit 34 based on the pulse signal TRF1 or taken into the third latch circuit 36 based on the pulse signal TRF2.

With the configuration described above, by the first stage ST1, an analog signal read from each pixel is subjected to one-bit A/D conversion and an MSB is determined. A quantized difference between a value of the determined MSB and the analog signal is doubled by the amplifier 65, and is then inputted to the second state ST2. The second stage ST2 determines the second bit from the MSB by performing one-bit A/D conversion on the analog signal inputted from the first stage ST1. Hereinafter, up to the final m-th stage STm, all the bits down to the LSB are determined by repeating the one-bit A/D conversion on a value obtained by doubling a quantized difference at the previous stage.

A pixel reset signal RST and a pixel signal SIG obtained by the A/D converter 60 are inputted to the computing section 24 in accordance with the column selection signal HSCAN and a difference therebetween is calculated.

Other points of FIG. 11 are the same as those of FIG. 5, and the same or corresponding portions are provided with the same reference numerals and their repeated description is omitted.

Even with the solid-state image pickup device including the A/D converter 60 of a pipeline type described above, as is the case with the first embodiment, it is possible to perform, by the correlation double sampling, noise removal of the digital pixel signal obtained through the A/D conversion and also to perform horizontal transfer processing on the digital pixel signal already subjected to the A/D conversion in parallel to the A/D conversion processing. As a result, high-speed signal processing with high accuracy can be performed, thus providing an image signal of high quality.

Note that, as also described in the first embodiment, operation of data taking of the second and third latch circuits 35 and 36 may be performed at different timing. In this case, a timing signal different from the second timing signal TRF2 inputted to the clock terminal of the second latch circuit 35 is generated by the timing generator 14 and is inputted to the clock terminal of the third latch circuit 36.

<Modified Example of Third Embodiment>

Figure 12:
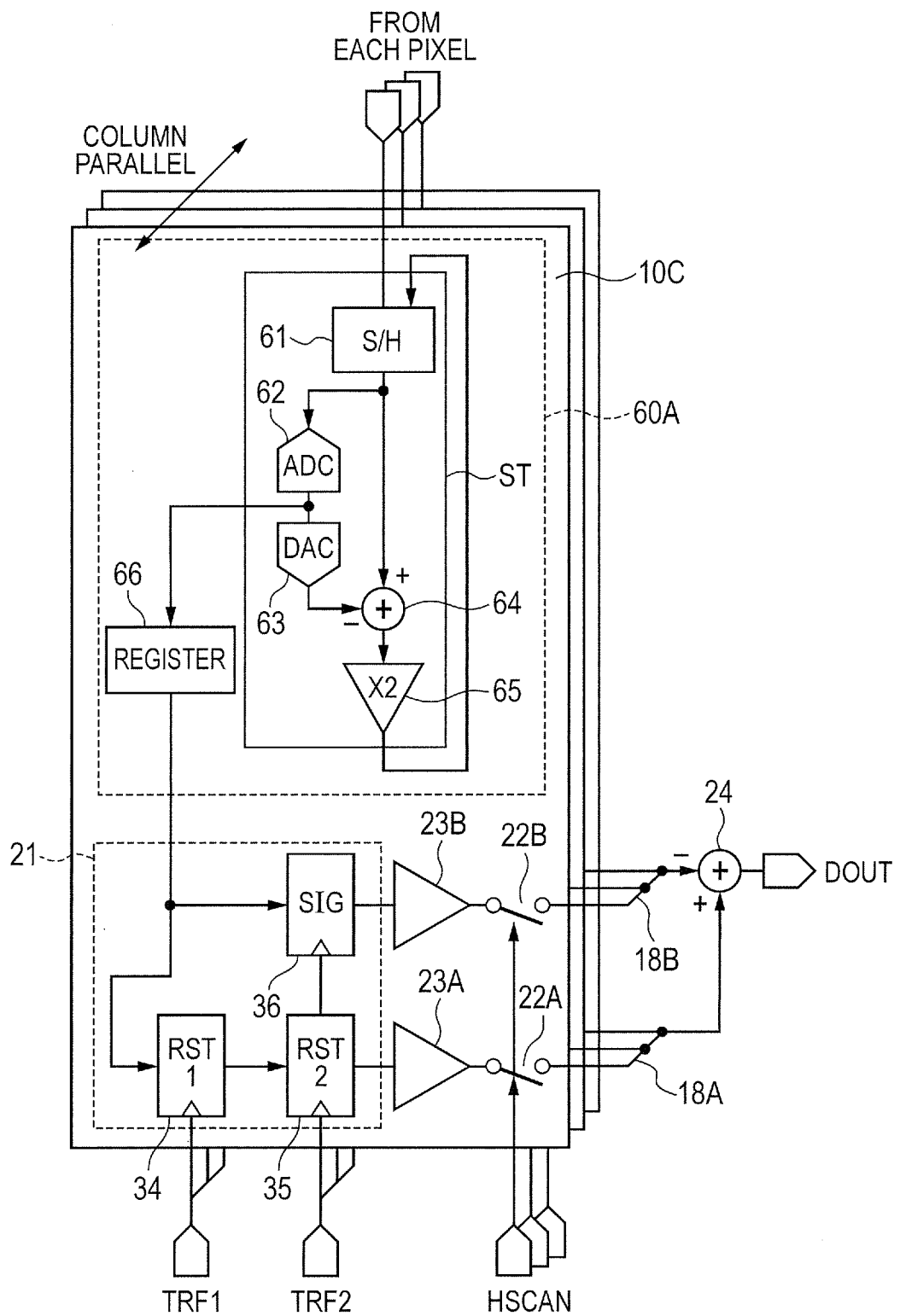
FIG. 12 is a block diagram showing the configuration of a column circuit 10C as a modified example of the column circuit 10B of FIG. 11.

FIG. 12 is a block diagram showing configuration of a column circuit 10C as a modified example of the column circuit 10B of FIG. 11. The column circuit 10C of FIG. 12 is different from the column circuit 10B of FIG. 11 in that an A/D converter 60A of a circular type is provided instead of the A/D converter 60 of a pipeline type. Other points of FIG. 12 are the same as those of FIG. 11, and the same or corresponding portions are provided with the same reference numerals and their repeated description will be omitted.

Referring to FIG. 12, the A/D converter 60A of a circular type includes: one stage ST corresponding to one of the stages ST of the A/D converter 60 of a pipeline type of FIG. 11, and a register 66. Output of an amplifier 65 at the stage ST is inputted again to an S/H circuit 61 on an input side of the stage ST. By circulating a signal in this manner, as is the case with the A/D converter 60 of a pipeline type of FIG. 11, results of A/D conversion are determined bit by bit in order starting with the MSB. The result of the A/D conversion of each bit is stored into the register 66. A value of the register 66 is taken into the first latch circuit 34 based on the pulse signal TRF1 or taken into the third latch circuit 36 based on the pulse signal TRF2.

<Fourth Embodiment>

Figure 13:
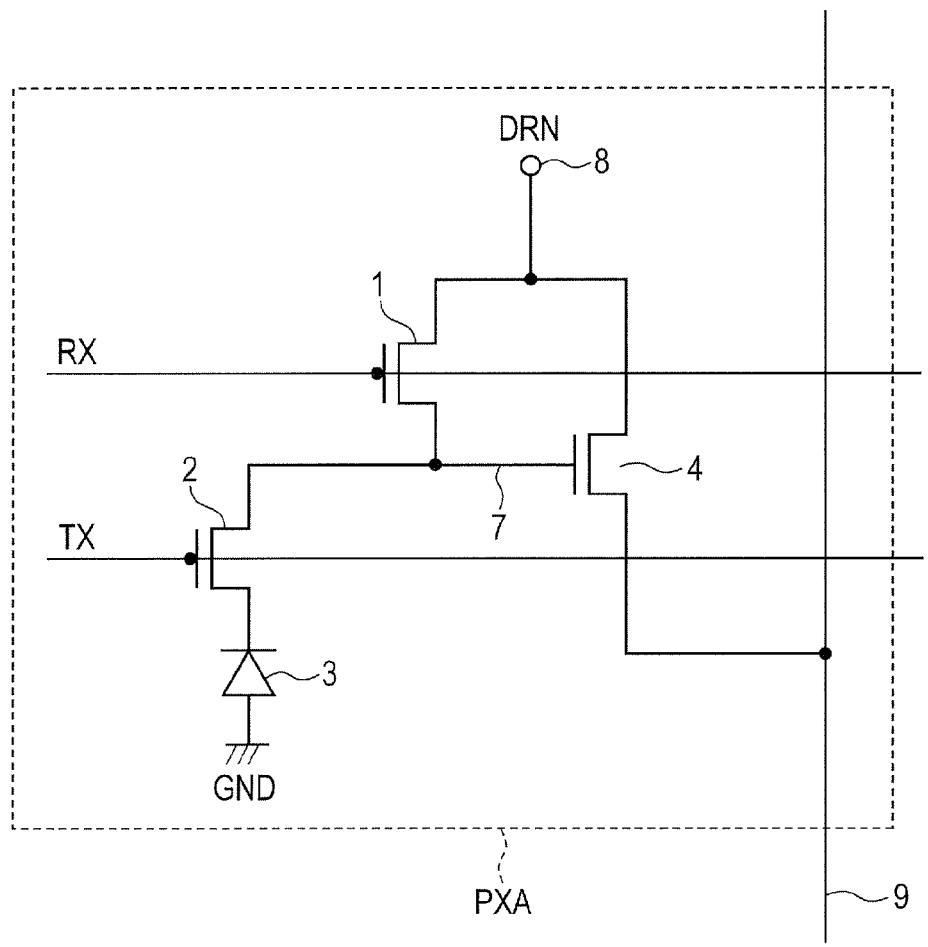
FIG. 13 is a circuit diagram showing the configuration of a pixel PXA applied to a solid-state image pickup device according to a fourth embodiment of the present invention.

FIG. 13 is a circuit diagram showing configuration of a pixel PXA applied to a solid-state image pickup device according to a fourth embodiment of the present invention.

The pixel PXA of FIG. 13 differs from the pixel PX of FIG. 3 in that the select transistor 5 is not included. Further, in the case of the pixel PXA, not the supply voltage VDD but control voltage DRN is applied to drains (nodes 8) of the transistors 1 and 4.

As shown in FIG. 13, the pixel PXA includes: a photodiode (photoelectric conversion section) 3, a transfer transistor 2, a reset transistor 1, an amplifying transistor 4, and a floating diffusion (electric charge accumulation section) 7. In the case of FIG. 13, the transistors 1, 2, and 4 are formed by N-channel MOS transistors as one example.

The photodiode 3 photoelectrically converts an optical signal into an electric signal. The transfer transistor 2 is coupled to a cathode of the photodiode 3, and transmits to the floating diffusion 7 an electric signal generated by the photodiode 3 in accordance with a transfer signal TX. The reset transistor 1 sets voltage of the floating diffusion 7 at the control voltage DRN (supply voltage VDD or grounding voltage GND) in accordance with a reset signal RX. In a case where the pixel PXA is not selected, the control voltage DRN is set at the grounding voltage GND (L-level). As a result, the amplifying transistor 4 turns into an OFF state. In a case where the pixel PXA is selected, the control voltage DRN is set at the supply voltage VDD (H-level). The amplifying transistor 4, when the pixel PXA has been selected, outputs to the vertical reading line 9 a signal in accordance with signal potential on the floating diffusion 7.

Figure 14:
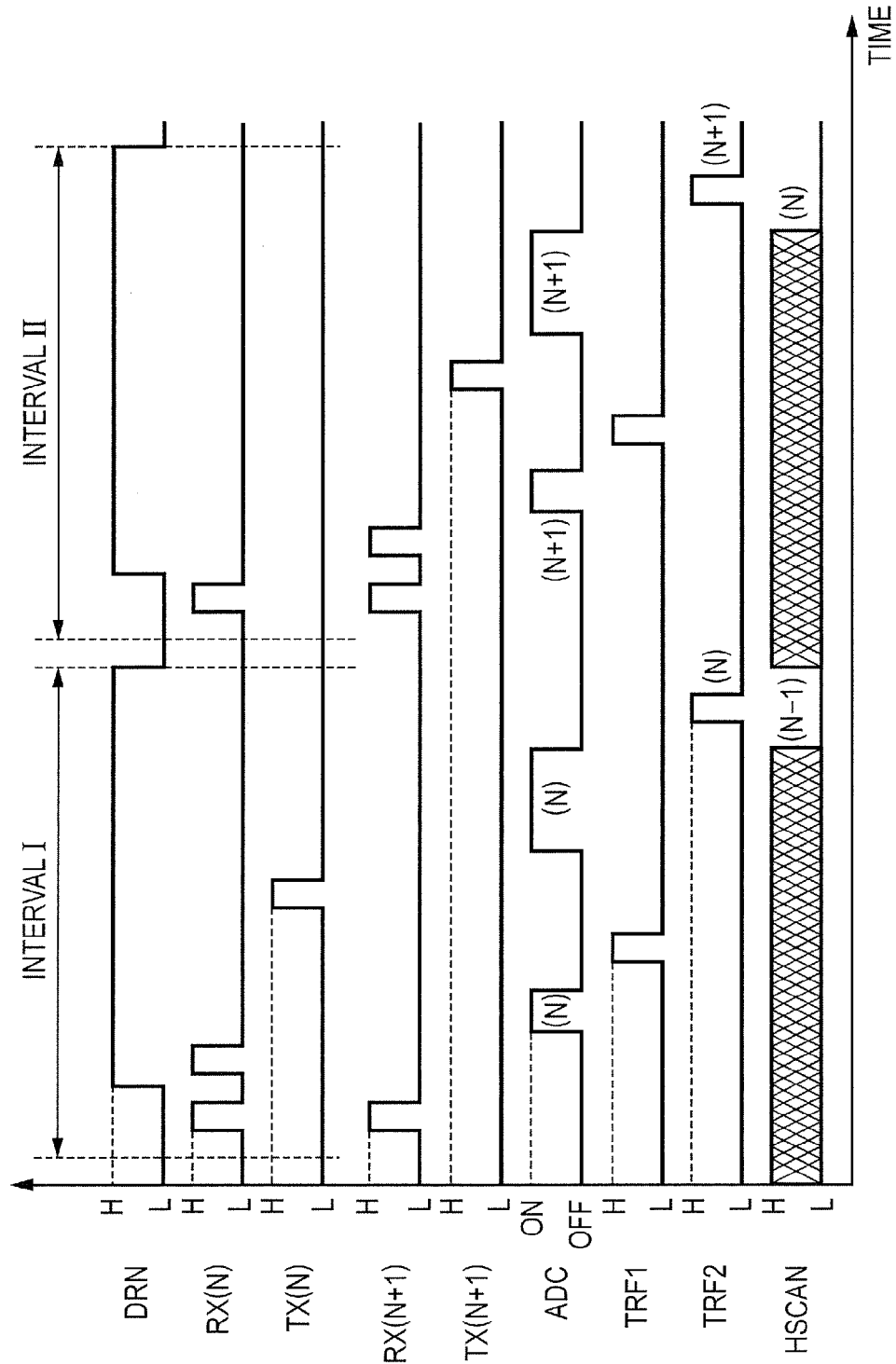
FIG. 14 is a timing diagram of the solid-state image pickup device according to the fourth embodiment.

FIG. 14 is a timing diagram of a solid-state image pickup device according to the fourth embodiment. For each pixel forming the solid-state image pickup device, the pixel PXA of FIG. 13 is used, and for a column circuit, the column circuit 10 of FIG. 5 is used. Hereinafter, referring to FIGS. 5, 13, and 14, operation of the solid-state image pickup device according to the fourth embodiment will be described.

Each pixel at the N-th row is selected at an interval I of FIG. 14, and a signal from each selected pixel is read out. At an interval II, each pixel at the (N+1)-th row is selected, and a signal from each selected pixel is read out.

More specifically, at a first time zone of the interval I, that is, when the control voltage DRN is at an L-level, reset signal RX supplied to all rows switches to an H-level. At this point, the control voltage DRN is at the grounding voltage GND (an L-level), and thus the floating diffusion 7 of each pixel at all the rows turns into the grounding voltage GND. As a result, the amplifying transistor 4 of each pixel at all the rows turns into an OFF state. After the reset signal RX supplied to all the rows returns to an L-level, the control voltage DRN switches to an H-level, and then the reset signal RX (N) supplied to each pixel at the N-th row switches to an H-level. At this point, the control voltage DRN is the supply voltage VDD (at an H-level), and thus the floating diffusion 7 of each pixel at the N-th row as the selected row is reset by the supply voltage VDD.

Subsequent operation is the same as that of FIG. 8. Briefly describing, a pixel reset signal outputted from each pixel at the selected row is subjected to A/D conversion by the A/D converter 20. A result of the A/D conversion is taken in and held by the first latch circuit 34 upon falling of the first timing signal TRF1. Next, the transfer signal TX (N) supplied to each pixel at the selected row (N-th row) turns into an H-level, whereby photoelectric charges generated at the photodiode 3 of each pixel at the selected row are transmitted to the floating diffusion 7. After the transfer signal TX (N) returns to an L-level, a pixel signal outputted from each pixel at the selected row is subjected to A/D conversion by the A/D converter 20. A result of the A/D conversion is taken in and held by the third latch circuit 36 upon failing of the second timing signal TRF2. At this point, the pixel reset signal RST obtained through the A/D conversion and held by the first latch circuit 34 is taken in and held by the second latch circuit 35. The pixel reset signal RST and the pixel signal SIG respectively held by the first and second latch circuits 34 and 35 are sequentially transferred to the computing section 24 in accordance with the column selection signal HSCAN by the time at which the second timing signal TRF2 turns into an H-level (that is, the pulse signal TRF2 is generated) at the next interval II.

As described above, even with the solid-state image pickup device according to the fourth embodiment, as is the case with the first embodiment, it is possible to perform, by the correlation double sampling, noise removal on the digital pixel signal obtained through the A/D conversion, and also to perform horizontal transfer of the digital pixel signal already subjected to the A/D conversion in parallel to the A/D conversion processing. As a result, high-speed signal processing with high accuracy can be performed, thus providing an image signal of high quality.

<Modified Example of Fourth Embodiment>

Figure 15:
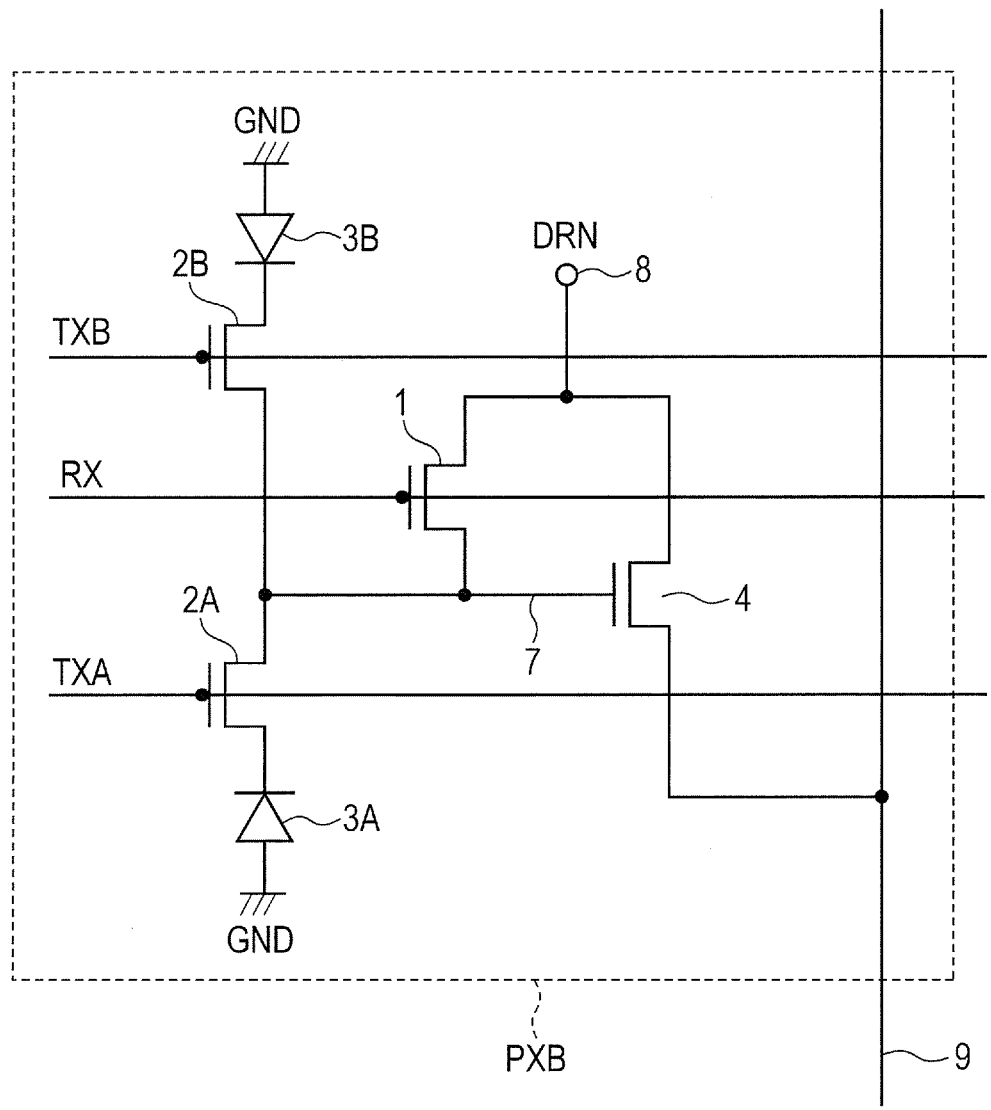
FIG. 15 is a circuit diagram showing configuration of a pixel PXB as a modified example of the pixel PXA of FIG. 13.

FIG. 15 is a circuit diagram showing the configuration of a pixel PXB as a modified example of the pixel PXA of FIG. 13. The pixel PXB of FIG. 15 differs from the pixel PXA of FIG. 13 in that two photodiodes and two transfer transistors are provided. That is, the pixel PXB includes: photodiodes (photoelectric conversion sections) 3A and 3B, transfer transistors 2A and 2B, a reset transistor 1, an amplifying transistor 4, and a floating diffusion (electric charge accumulation section) 7. In the case of FIG. 15, the transistors 1, 2A, 2B, and 4 are formed by N-channel MOS transistors as one example.

Each of the photodiodes 3A and 3B photoelectrically converts an optical signal into an electrical signal. The transfer transistor 2A is coupled to a cathode of the photodiode 3A, and transmits to the floating diffusion 7 the electrical signal generated by the photodiode 3A in accordance with a transfer signal TXA. The transfer transistor 2B is coupled to a cathode of the photodiode 3B, and transmits to the floating diffusion 7 the electrical signal generated by the photodiode 3B in accordance with a transfer signal TXB. The transfer transistors 2A and 2B selectively turn into an ON state. The reset transistor 1 sets voltage of the floating diffusion 7 at control voltage DRN (supply voltage VDD or grounding voltage GND) in accordance with the reset signal RX. In a case where the pixel PXB is selected, the control voltage DRN is set at the supply voltage VDD. The amplifying transistor 4, when the pixel PXB has been selected, outputs to the vertical reading line 9 a signal in accordance with signal potential on the floating diffusion 7.

The configuration described above has the two photodiodes provided in the pixel PXB composed of the four transistors, and is thus typically called 2-transistor configuration. On the contrary, in the case of FIG. 13, the configuration has one photodiode in the pixel PX composed of the three transistors and is thus called 3-transistor configuration.

Even with the pixel PXB with the configuration of FIG. 15, through the same control as that of the fourth embodiment shown in FIGS. 13 and 14, it is possible to perform, by the correlation double sampling, noise removal on the digital pixel signal obtained through the A/D conversion, and also to perform horizontal transfer of the digital pixel signal already subjected to the A/D conversion in parallel to the A/D conversion processing. However, in the case of FIG. 15, the transfer transistors 2A and 2B selectively turn into an ON state, and the photoelectric charges generated at one of the photodiodes 3A and 3B are selectively read out.

All points of the embodiments disclosed herein should be considered to be just illustrative and not limiting. The scope of the present invention is indicated not by the above description but by the scope of the claims, and all modifications within the spirits and a range equivalent to the scope of the claims are intended to be included.

What is claimed is:

1. A solid-state image pickup device comprising:
   a pixel array including a plurality of pixels arrayed in a matrix form, each pixel having a photoelectric conversion element and an electric charge accumulation section;
   a plurality of column signal lines respectively provided in correspondence with columns of the pixel array; and
   a row selection circuit selecting a row of the pixel array and activating a reset signal and a transfer signal outputted to each pixel at the selected row in order just mentioned, when the inputted reset signal is in an active state, each pixel at the selected row initializing the electric charge accumulation section and outputting to the corresponding column signal line, as a first analog signal, a signal in accordance with an amount of electric charges in the electric charge accumulation section in an initial state; and
   when the inputted transfer signal is in an active state, each pixel at the selected row transferring to the electric charge accumulation section the photoelectric charges generated by the photoelectric conversion element and outputting to the corresponding column signal line, as a second analog signal, a signal in accordance with the amount of electric charges in the electric charge accumulation section after the transfer of the photoelectric charges,
   the solid-state image pickup device further comprising:
   a plurality of analog-to-digital converters respectively in correspondence with the columns of the pixel array, each of the analog-to-digital converters digitally converting the first and second analog signals received via the column signal lines at the corresponding columns to respectively output first and second digital signals; and
   a plurality of data holding sections respectively provided in correspondence with the columns of the pixel array, wherein each of the data holding sections includes:
   a first latch circuit taking in and holding the first digital signal outputted from the analog-to-digital converter provided at the corresponding column based on a first pulse signal generated during a period from when the reset signal outputted to the currently selected row turns to an inactive state to when the transfer signal subsequently turns to an active state;
   a second latch circuit taking in and holding the first digital signal held at the first latch circuit based on a second pulse signal generated during a period from when the transfer signal outputted to the currently selected row turns to an inactive state to when the reset signal outputted to the next selected row turns to an active state; and
   a third latch circuit taking in and holding the second digital signal outputted from the analog-digital converter provided at the corresponding column based on a third pulse signal generated during a period from when the transfer signal outputted to the currently selected row turns to an inactive state to when the reset signal outputted to the next selected row turns to an active state.

2. The solid-state image pickup device according to claim 1, wherein the third pulse signal is the same signal as the second pulse signal.

3. The solid-state image pickup device according to claim 2, further comprising:
   a column selection circuit selecting the column of the pixel array; and
   a computing section calculating, in response to the transfer of the first and second digital signals respectively held at the second and third latch circuits corresponding to the column selected by the column selection circuit, a difference between the received signals.

4. The solid-state image pickup device according to claim 3, wherein the first and second digital signals held at the second and third latch circuits in correspondence with the currently selected row are transferred to the computing section by time at which the second and third pulse signal are generated for taking the first and second digital signals corresponding to the next selected row into the second and third latch circuits.

5. The solid-state image pickup device according claim 1, wherein each of the analog-to-digital converters is a converter of an integral type.

6. The solid-state image pickup device according to claim 1, wherein each of the analog-to-digital converters is a converter of a successive-approximation type.

7. The solid-state image pickup device according to claim 1, wherein each of the analog-digital converters is a converter of a circulating or pipeline type.

* * * * *